Oct. 24, 1939.    C. R. BEARD    2,177,513
FLAG HOLDER AND SUPPORT THEREFOR
Filed April 28, 1938
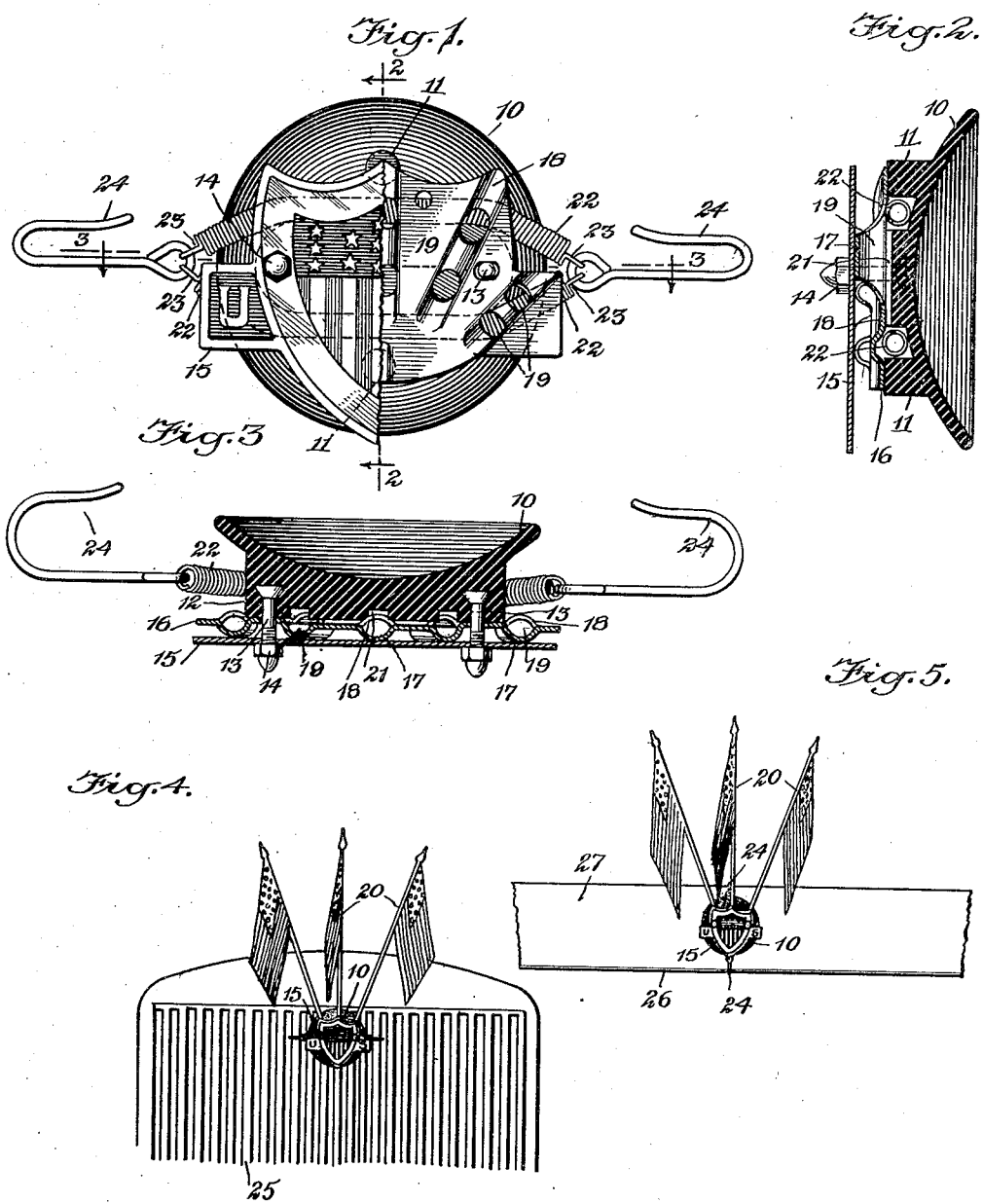
WITNESSES
INVENTOR
Cameron R. Beard
BY
ATTORNEYS Patented Oct. 24, 1939

2,177,513

UNITED STATES PATENT OFFICE 2,177,513

FLAG HOLDER AND SUPPORT THEREFOR

Cameron R. Beard, Essex Fells, N. J., assignor to Annin & Co., New York, N. Y., a corporation of New York Application April 28, 1938, Serial No. 204,744

2 Claims. (Cl. 248—39)

This invention relates to devices for supporting and displaying flags or similar articles.

An object of the invention is to provide a device for flags or similar articles which may be displayed, and which device may be easily fastened to a larger object.

A further object of the invention is to provide a device of the character described which may be fastened to a flat polished surface without marring, cutting or injuring such surface.

An additional object is to provide a device of the character described which is adapted to be used in connection with the radiator or bumper of an automobile and which is easily and quickly applied but which will be easily detachable.

With these and other objects in view, which will be more apparent as the description proceeds, reference may be had to the accompanying drawing in which—

Fig. 1 is a front view of my device, partly cut away to show the construction thereof;

Fig. 2 is a cross sectional view taken on the line 2—2 of Fig. 1;

Fig. 3 is a cross sectional view taken on the line 3—3 of Fig. 1;

Fig. 4 is a view displaying my device applied to an automobile radiator; and

Fig. 5 is a view of the device attached to a bumper of an automobile.

Referring more particularly to the drawing, I provide a suction cup 10 made of rubber or other suitable material having on its convex face studs 11 and a centrally raised portion 12. The raised portion 12 has embedded or permanently anchored at either end thereof screws 13 threaded at their outer portions to receive the nuts 14. An outer plate 15 and an inner plate 16 are affixed with relation to the suction cup 10 by means of the screw members 13 and the nuts 14. The inner plate 16 has a plurality of raised portions 17 and depressed channels 18 forming openings 19. The openings 19 are formed by cuts through the plate 16 with the material between the cuts offset to present the central portions 17 raised, and the channel 18 depressed and therefore present a supporting member for a flag pole or similar article 20. The outer plate 15 may be decorative in form, and while I have shown the plate 15 in the form of an American shield, any other decorative form may be used.

The raised portion 12 of the suction cup 10 is provided with channels 21 which register with the channels 18 in order that the plate 16 may set firmly against the raised portion 12 and the studs 11.

In addition to the suction cup holding means I provide a pair of coil resilient spring members 22, each of which is normally in an arc-shaped position and which in one position pass between the studs 11 and the raised portion 12 and are held in place by the plate 16. The spring members 22 are joined at their ends 23 to hooks 24 as shown in Fig. 1.

In use the device may be applied to a radiator grille 25 by pressing the suction cup and extending the spring 22 and fastening the hook members 24 into the bars of the grille. Or it may be applied to a bumper 26 by pressing the suction cup and fastening it to the surface 27 of the bumper, and then securing the hooks 24 over the edges of the bumper.

While I have shown my device applied to a bumper and to a radiator grille, it will be appreciated that it may be applied to any flat surface by the use of the suction cup, and to any open surface by the use of hooks, or by a combination of both. If desired, the spring members 22 and the hooks 24 may be removed and the device applied directly to a flat surface.

It will be appreciated that while I have shown a particular construction embodying my conceptive idea, this invention is not limited to such construction, and that many obvious and expedient forms may be developed therefrom.

I claim:

1. A device for supporting flags and the like, comprising a primary support formed as a suction cup having on its back a raised portion formed with channels, a plurality of bolts having their heads permanently anchored in said raised portion, a supporting plate positioned flatwise against said raised portion, said supporting plate being provided with a series of pressed-out loops for forming flagstaff receiving sockets, there being one series for each of the channels in said raised portion and positioned so that approximately one-half of each series of loops is positioned in said channels, an ornamental plate positioned flatwise on top of said supporting plate, said bolts extending through both of said plates, and nuts for said bolts for clamping said plates to said suction cup.

2. A device for supporting flags and the like, comprising a primary support formed as a suction cup provided with a raised portion on the back, a supporting plate formed with flag-staff receiving sockets, said supporting plate being positioned flatwise against said raised portion, an ornamental plate arranged on top of said supporting plate, means extending from said suction cup through said plates for clamping both plates firmly to the suction cup, a pair of coil springs, one spring being arranged on each side of said raised portion, and a pair of hooks connected to said coil springs, said hooks connecting the respective ends of the coil springs and with the coil springs providing auxiliary resilient means for supporting the device on an article.

CAMERON R. BEARD.